_United States Patent_ [19]

Tada et al.

[11] 4,327,346

[45] Apr. 27, 1982

[54] ANISOTROPIC POLYMERIC MAGNET IN THE TUBULAR FORM AND PROCESS FOR PRODUCING THE SAME

[75] Inventors: Takeo Tada, Urawa; Katsuji Honda, Yachiyo; Yoshifumi Hirata, Tokyo, all of Japan

[73] Assignee: TDK Electronics Co., Ltd., Tokyo, Japan

[21] Appl. No.: 121,587

[22] Filed: Feb. 14, 1980

[30] Foreign Application Priority Data

Feb. 28, 1979 [JP] Japan .................................. 54-22036
Feb. 28, 1979 [JP] Japan .................................. 54-22038

[51] Int. Cl.³ .............................................. H01F 1/00
[52] U.S. Cl. ............................... 335/296; 252/62.54; 264/24; 264/108; 264/328.1; 335/303
[58] Field of Search .............. 264/24, 108, 328, 328.1; 252/62.54; 335/296, 303

[56] References Cited

U.S. PATENT DOCUMENTS 3,732,617 5/1973 Rowe et al. .......................... 264/108
4,022,701 5/1977 Sawa et al. ........................ 252/62.54

FOREIGN PATENT DOCUMENTS 5121198 6/1968 Japan .

_Primary Examiner_—Donald E. Czaja
_Assistant Examiner_—W. Thompson
_Attorney, Agent, or Firm_—Armstrong, Nikaido, Marmelstein & Kubovcik

[57] ABSTRACT

In an anisotropic polymeric magnet in tubular form, the magnetization orientation is directed in one direction perpendicular to the axial line of the tubular magnet. In a bipolar anisotropic magnet in tubular form, the magnetic poles can be formed only at symmetrical portions of the magnet with respect to the axial line and an imaginary line connecting the magnetic poles with each other is parallel to said one direction.

In order to symmetrically distribute the magnetism around a tubular bipolar anisotropic magnet, a weld line(s) formed by injection molding of a mixture of ferromagnetic material powder and polymeric material is located in the portion(s) of the magnet where the magnetic poles are not formed.

In the processes for producing the tubular anisotropic magnet, the gate(s) for injecting a mixture of ferromagnetic material powder and polymeric material is positioned in an injection machine, so that the position of the confronting ends of the flow(s) of the mixture do not coincide with the position of the magnetic poles.

18 Claims, 16 Drawing Figures

ANISOTROPIC POLYMERIC MAGNET IN THE TUBULAR FORM AND PROCESS FOR PRODUCING THE SAME

The present invention relates to an anisotropic polymeric magnet in tubular form, and a process for producing the anisotropic polymeric magnet in tubular form by using an injection machine, in which a mixture of ferromagnetic material and polymeric material is injection-molded under a strong magnetic field.

Anisotropic magnets are distinguished from isotropic magnets in the fact that the easy axis of magnetization, usually the C axis, of the ferromagnetic crystals is oriented in a predetermined direction or directions. The tubular anisotropic magnets are widely used in rotating machines, such as DC motors, generators, hysteresis motors and the like. Tubular anisotropic magnets are roughly classified into magnets with a radially oriented direction of magnetization, which are hereinafter referred to as radial anisotropic magnets, and magnets with a bipolar orientation of direction of magnetization, which are hereinafter referred to as bipolar anisotropic magnets. Since the magnetic flux of the bipolar anisotropic magnet can be more effectively utilized for rotating the DC motors and the like than that of the radial anisotropic magnet, the bipolar anisotropic magnet is more desirable than the radial anisotropic magnet for manufacturing DC motors and the like. Isotropic magnets produced by sintering are mainly used for rotating devices at the present time. The materials used for isotropic magnets are barium ferrite, strontium ferrite and the like, which have a high coercive force.

When the powder of barium ferrite and the like are pressed under a magnetic field, the so produced pressed body and the magnet produced by sintering this body can exhibit an anisotropy. During the pressing of a tubular body under a magnetic field, the particles being pressed become dense in portions of the tubular body which are diametrically opposite to one another in the direction of the magnetic field. The tubular body, therefore, tends to disadvantageously distort and cracks in the tubular body are caused by the distortion. In addition, it is necessary to grind the surfaces of the tubular body when it is used for small sized motors, because the magnets used in the small sized motors must have a high accuracy of dimension. The grinding of high dimensional accuracy is however expensive. In addition, in the sintered tubular magnets angular distribution of magnesium around the tubular magnets is not symmetrical. Furthermore, a bipolar anisotropic magnet cannot be produced by the sintering process due to difficulty in orienting the easy axis of magnetization in one direction.

It is known that in order to improve the low dimensional accuracy of the sintering process mentioned above, the mixture of ferromagnetic powder and organic resin can be shaped by an injection molding process, so as to obtaining shaped bodies having the same excellent dimensional accuracy as with usual plastic materials. In the Japanese Laid Open Patent Application No. 51-21,198 there is proposed an injection molding process for producing an anisotropic resinous magnet in tubular form by an injection molding of a mixture of thermoplastic resin and ferromagnetic powder. In the proposed process, a magnetic field is radially applied to the mixture under producing an anisotropic resinous magnet in a tubular form by an injection molding of a mixture of thermoplastic resin and ferromagnetic applied to the mixture under heating while the mixture is being filled in a tubular mold cavity by injection. The anisotropic resinous magnetic obtained by the process of the Japanese Laid Open Patent Application No. 51-21,198 has a radial direction of magnetization, because the direction of the magnetic field appled during the injection molding is radial.

A bipolar anisotropic magnet in tubular form, which is produced by a German Company "Valvo", is used for the motor of a camera. The angular distribution of magnetism around the section of tubular magnet is not desirably symmetrical. In the bipolar anisotropic magnet produced by Valvo, the magnetic poles are formed on two vertical lines or zones which are opposite to one another. In addition, the weld lines formed at the discontinuously flown portions of the injection molded materials approximately coincide with the lines of the magnetic poles. The low symmetry is caused, according to research conducted by the present inventors, by the relative positions of the magnetic poles and the weld lines.

It is an object of the present invention to provide an anisotropic polymeric magnet in tubular form, having an excellent bipolar magnetization orientation in the magnetic field direction. The magnetization orientation in the magnetic field direction according to the present invention should be such that the distribution of magnetic flux density at each of the magnetic poles is almost symmetrical to one another and, further, the magnetic flux density at the N pole and S pole sides is high.

It is another object of the present invention to provide a process for producing an anisotropic polymeric magnet having an excellent bipolar magnetization.

In accordance with the present invention, there is provided an anisotropic polymeric magnet in tubular form, wherein the tubular magnet is formed by injection molding of a mixture of ferromagnetic material and polymeric material, and the magnetization orientation of the magnet is directed in one direction perpendicular to the axial line of the tubular magnet, characterized in that a weld line or lines are formed at a portion or portions of the tubular magnet and an imaginary horizontal line connecting said portion or portions with the axis of the tubular magnet is perpendicular to said one direction.

The magnetic poles of the magnet according to the present invention are formed on diametrically opposite portions of the magnet, and the direction of the weld line or lines from one of the magnetic poles is essentially the same as the distance from the other magnetic pole.

In accordance with the present invention, there is provided a process, hereinafter referred to as a one gate process, for producing an anisotropic polymeric magnet in tubular form, wherein a mixture of ferromagnetic material powder and polymeric material is injection-molded into the tubular cavity of a mold, while a magnetic field is applied to the injection-molded mixture in a direction perpendicular to the axial line of the tubular mold cavity, characterized in that the mixture is injection-molded through one gate formed in the neighborhood of one of the ends of the tubular mold cavity, and the applying direction of the magnetic field mentioned above is perpendicular to an imaginary line, which connects the gate and an axial symmetrical position of the gate with respect to the axial line of the tubular mold cavity.

In accordance with the present invention, there is provided a process, hereinafter referred to as a two gate process, for producing an anisotropic polymeric magnet in tubular form, wherein a mixture of ferromagnetic material powder and polymeric material is injection-molded into the tubular cavity of a mold, while a magnetic field is applied to the injection-molded mixture in a direction perpendicular to the axial line of the tubular mold cavity, characterized in that the mixture mentioned above is injection-molded through two gates formed in the neighborhood of one of the ends of the tubular mold cavity, one of the gates is axially symmetrical to the other gate with respect to the axial line of the tubular mold cavity, and the applying direction of the magnetic field is parallel to an imaginary line formed by connecting the two gates with each other.

The term "magnetization orientation", used herein, means that the easy axis of crystals of the ferromagnetic material powder is oriented in the direction of the magnetic field applied to the ferromagnetic material powder. The expression "good magnetization orientation of a bipolar anisotropic magnet in a tubular form", used herein, means that the magnetization orientation is desirably directed in one direction perpendicular to the axial line of the tubular magnet. The term "characteristic of magnetization orientation", used herein, means the magnitude and angular distribution of magnetism at the region of a tubular magnet in which the magnetization orientation occurs.

The term "magnet", used herein, means the ferromagnetic material having a property of being capable of strongly magnetized in a magnetic field. The magnet, therefore, includes both the ferromagnetic material mentioned above already magnetized and still not magnetized.

In order to obtain the bipolar anisotropic magnet of tubular form, it is necessary to apply a straight magnetic field in a direction perpendicular to the axial line of the tubular body during the injection molding of the mixture of ferromagnetic material powder and polymeric material. Based on studies conducted by the present invention, it was found that the physical properties of anisotropic polymeric magnets are largely varied in accordance with the relationship between the position of the magnetic poles and the position of the weld line or lines, as well as the relationship between the direction of the magnetic field and the installing position of a gate or gates for injecting the mixture of ferromagnetic material powder and polymeric material into the tubular mold cavity. When one gate, such as a side gate or pin gate, is communicated with the tubular mold cavity and oriented in the direction of the magnetic field, the mixture flows during the injection molding in the direction of the magnetic field. The injected mixture is highly flowable in the proximity of the gate, where the temperature is high. The mixture is cooled, and hence the flowability thereof is reduced, as the mixture flows away from the gate. The flowability of the mixture is particularly low at the weld line of the injection molded body. The magnetization orientation of the bipolar anisotropic magnet in tubular form is good at a portion thereof adjacent to the gate, but is not good at a portion thereof diametrically opposite to the good portion. In the bipolar anisotropic magnet in tubular form, it is required that the characteristic of magnetization orientation be the same at both portions mentioned above. However, such requirement is not fulfilled, when the mixture mentioned above is injection-molded through one gate into the mold cavity in the direction of the magnetic field. When two gates are used for injection molding of the mixture and, further, when the direction of the gates is perpendicular to both the axial line of the tubular magnet and the direction of the magnetic field, the flowability of the mixture during the injection molding is the highest at the gates and the lowest in portions of the tubular mold cavity which are farthest away from the gates. The weld line is formed in these portions. The magnetic poles of the bipolar anisotropic magnet are formed in portions thereof where the flowability of the mixture is low during the injection molding and, further, the weld line is formed. The characteristic of magnetization orientation of the bipolar anisotropic magnet in tubular form is least desirable at portions of the magnet where the weld line is formed. The portions of the tubular magnet where the flowability of the mixture is highest during injection molding cannot be utilized as the magnetic poles.

When the weld line or lines are formed in the portions of the bipolar anisotropic magnet in tubular form where the magnetic poles are not formed, the weld line or lines do not deteriorate the characteristic of magnetization orientation. In addition, when the distance of the weld line or lines from one of the magnetic poles is essentially the same as the distance from the other magnetic pole, an excellent symmetry of the characteristic of magnetization orientation is obtained.

Embodiments of the present invention and experiments conducted by the present inventors are explained hereinafter with reference to the drawings, wherein.

Figure 1:
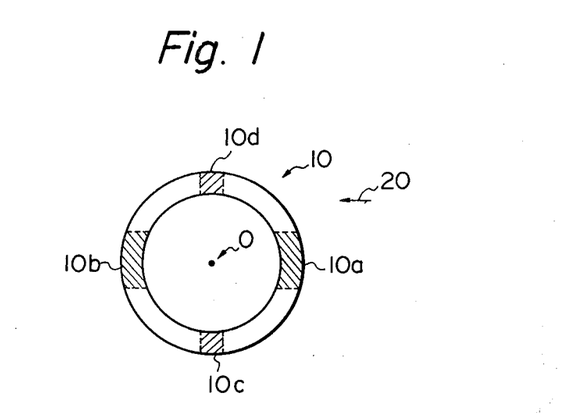
FIG. 1 is a plan view of an anisotropic polymeric magnet in the tubular form according to an embodiment of the present invention.
Figure 2:
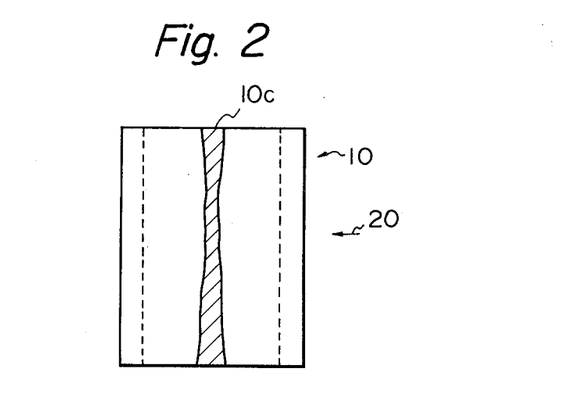
FIG. 2 is a front view of FIG. 1.

An anisotropic polymeric magnet 10 in tubular form according to an embodiment of the present invention is illustrated in FIGS. 1 and 2. Referring to FIGS. 1 and 2, the polymeric magnet 10 comprises ferromagnetic material powder and polymeric material. The ferromagnetic material powder used in the present invention may be the powder of a ferrite magnet expressed by the chemical formula $MO \cdot 6Fe_2O_3$ (M=Sr, Ba, Pb and the like), a rare earth cobalt magnet expressed by the chemical formula $RCo_5$ or $R_2CO_{17}$ (R=Sm, Y, La, Ce and the like), a manganese bismuth magnet, a manganese aluminum magnet, a cobalt magnet, e.g. an Al-Ni-Co magnet and a Fe-Cr-Co magnet, and the like.

The polymeric material used in the present invention may be a thermoplastic, such as nylon 6, nylon 66, nylon 12, polyethylene terephthalate, polyacetal, ABSresin, polyethylene, polypropylene, ethylene-vinyl acetate copolymer, ethylene alkylacrilate copolymer, polyvinyl acetate, and the polymeric material used in the present invention may also be a thermoset, such as phenol-formaldehyde resin, melamine-formaldehyde resin, urea-formaldehyde resin, epoxy resin, unsaturated polyester and a metal-crosslinked copolymer of ethylene and an α β unsaturated mono- or di-carboxylic acid. Further, the polymeric material used in the present invention may be a rubber, such as natural rubber, styrene-butadiene rubber, nitrile rubber and chloroprene rubber. However, thermoplastic is preferably used in the present invention. The weight proportion of ferromagnetic powder to polymeric material is from 97:3 to 83:17, preferably from 92:8 to 83:17 and, more preferably, from 88:12 to 96:4, still more preferably from 88:12 to 90:10.

When 0.01 to 2% by weight of a low molecular weight polyimide, an acid amide compound or zinc stearate is added into the mixture of ferromagnetic material and polymeric material, magnetic properties of an anisotropic polymeric magnet are enhanced.

The magnetization orientation of the anisotropic polymeric magnet 10 in tubular form is indicated by the arrow 20 in FIGS. 1 through 4. This magnet 10 can, therefore, be magnetized only in the direction of the arrow 20. As a result of the magnetization, the magnetic poles are formed on portions 10a and 10b of the magnet 10 denoted by the righthand down hatched lines in FIG. 1. The portions 10a and 10b are hereinafter referred to as the N pole portion and S pole portion, respectively. Furthermore, the anisotropic polymeric magnet 10 in tubular form is hereinafter referred to as the tubular bipolar magnet 10.

The weld lines 10c and 10d are indicated in FIGS. 1 and 2 by the righthand up hatching. The angle between the weld lines 10c and 10d and the N and S pole portions 10a and 10b around the axial line of the tubular bipolar magnet is approximately 90°. The weld lines 10c and 10d can be distinguished from the other portions of the tubular bipolar magnet 10 by the color of the surface of the magnet. The difference in color between the weld lines 10c, 10d and the other portion of the tubular bipolar magnet can be made non-distinguishable depending upon the injection molding condition, however, the mechanical and magnetic properties of the tubular bipolar magnet 10 are not satisfactorily high under such injection molding condition. The weld lines 10c and 10d are illustrated in strip form in FIGS. 1 and 2, but may be in line form as seen in FIG. 4.

Figure 3:
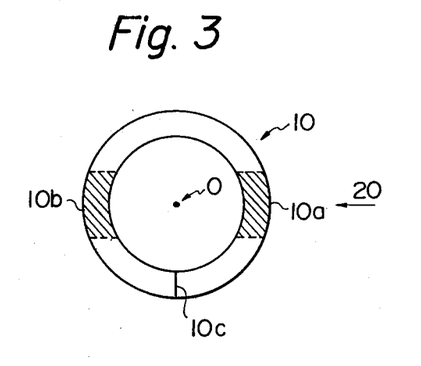
FIGS. 3 and 4 are views similar to FIGS. 1 and 2, respectively.
Figure 4:
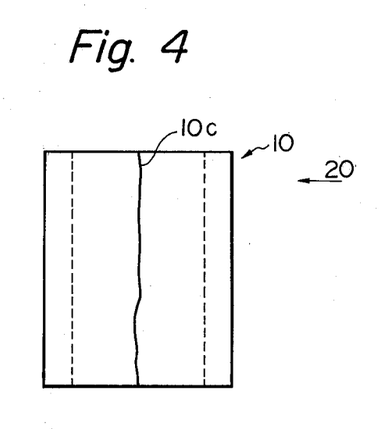

In the tubular bipolar magnet 10 illustrated in FIGS. 3 and 4, only one weld line 10 is formed between the N pole portion 10a and S pole portion 10b, and that line 10 almost linear.

Figure 5:
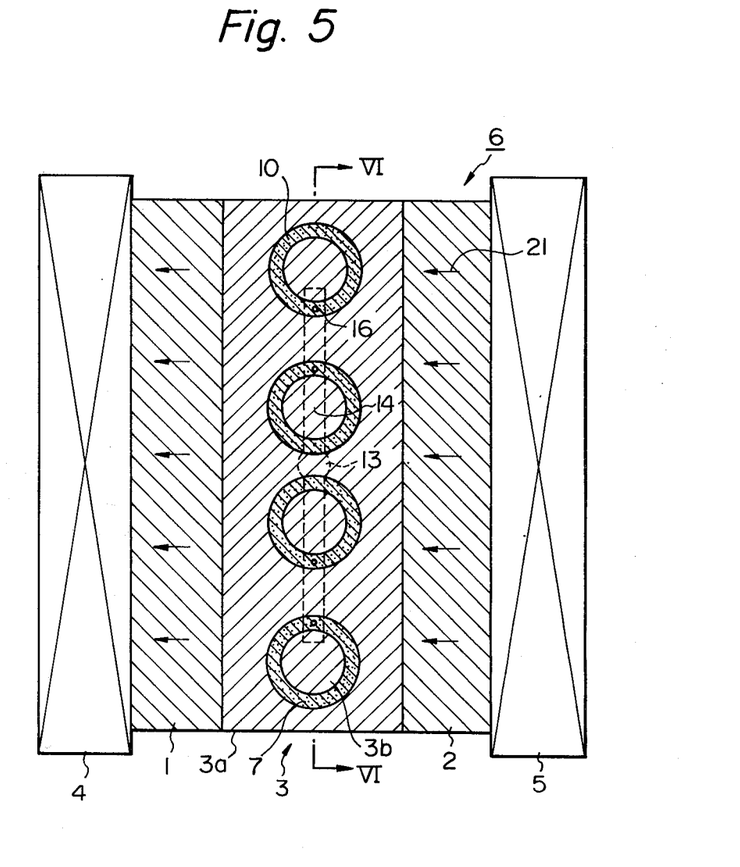
FIG. 5 is a cross sectional view of an injection machine for producing an anisotropic polymeric magnet in the tubular form.
Figure 6:
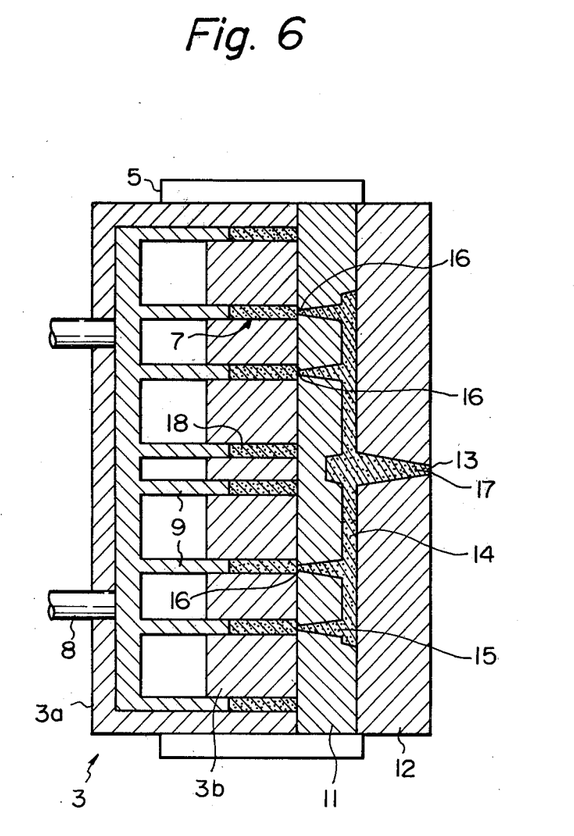
FIG. 6 is a cross sectional view along line VIVI of FIG. 5.

Referring to FIGS. 5 and 6, four tubular bipolar magnets 10 are shaped at one time by an injection machine 6. A shaping metallic mold 3 consists of a core plate 3a and cores 3b and is tightly held between yokes 1 and 2 for generating a magnetic field which is indicated in FIG. 5 by arrows 21. Electromagnets 4 and 5 are fitted on the end of the yokes 1 and 2. Tubular mold cavities 7 are formed in the shaping metallic mold 3, so that the axial line of the tubular mold cavities is perpendicular to the direction of the magnetic field 21. The core 3b are held by the protruding parts of an insert 9 which is rigidly connected to rods 8. A first plate 11 is secured to the metallic shaping mold 3, at the side opposite to the insert. A second plate 12 is secured to the first plate 11 and is provided with a sprue 13. The first plate 11 is provided with a runner 14 and nozzle apertures 15, which are communicated with the runner 14. At one of the ends of the nozzle apertures 15 pin gates 16 are formed.

Figure 7:
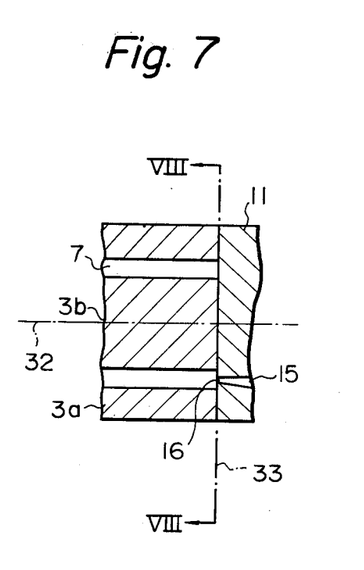
FIGS. 7 through 12 are schematic drawings for illustrating the tubular mold cavity, the direction of magnetic field and a gate.
Figure 8:
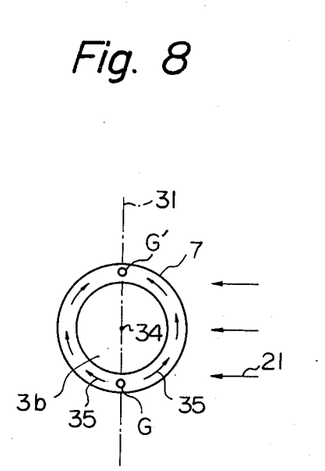

The relationship between the position of the pin gates 16 and the direction of magnetic field 21 of the injection machine 6 (FIGS. 5 and 6) will be understood from FIGS. 7 and 8. The direction of the magnetic field 21 is perpendicular to an imaginary line 31 which connects the position G of the pin gate 16 and an axial symmetrical position G' of the gate 16 with respect to an axial line 32 of the tubular mold cavity 7. The imaginary line 31 also connects the position G of the pin gate 16 and a center 34 of the core 3b on a parting plane 33 of the shaping metallic mold 3. The pin gate 16 is positioned at one end of the tubular mold cavity 7.

In the injection machine 6 illustrated in FIGS. 5 and 6, the one gate process according to the invention is carried out. A mixture 17 of ferromagnetic material powder and polymeric material having a predetermined temperature is injection-molded by a not illustrated cylinder of the injection machine. The molten mixture 17 is supplied through the sprue 13, the runner 14 and the nozzle apertures 15 into the pin gates 16, and then, the tubular mold cavity 7, while the magnetic field having the direction 21 is applied to the mixture 17 by means of the electromagnets 4 and 5. The magnitude of the magnetic field is varied in accordance with the required level of magnetic flux density of the tubular bipolar magnet to be produced. Usually, the magnitude of the magnetic field is selected so that the magnetic flux density is saturated. With regard to the conventional ferromagnetic material powder for permanent magnets, the magnitude of the magnetic field is from 4000 to 2000 Oe and in most cases from 6000 to 10000 Oe. The temperature of the mixture is varied in accordance with the plasticating temperature of the polymeric material used as the binder of the ferromagnetic material powder. In the case of nylon 6, this is heated before injection molding to a temperature of from 270° to 310° C.

The mixture is introduced via each of the pin gates 16 into the tubular mold cavity 7 and the mixture in a molten state advances in the tubular mold cavity 7 as a flow 35 (FIG. 8). The magnetization orientation occurs while the mixture advances in the tubular mold cavity 7. When the ends of the flow 35 (FIG. 8) of the molten mixture confront one another, approximately at the position of the tubular mold cavity indicated by reference G' in FIG. 8, the tubular mold cavity 7 is filled by the mixture and the weld line is formed at the position indicated by the reference G'. The mixture is then cooled and solidified. The first plate 11 and the second plate 12 are separated from the shaping metallic mold 3 after the cooling and solidification of the mixture. When the first and second plates are made of a ferromagnetic material, such as steel, these plates may be demagnetized and, then, separated from the shaping metallic mold. When the first and second plates are separated from the shaping metallic mold, the solidified mixture 17 in the sprue 13, the runner 14 and the nozzle apertures 15 are also separated from tubular bipolar magnets 18. The tubular bipolar magnets 18 are extruded from the shaping metallic mold 3 by pushing the insert 9 forward. The first plate 11 is separated from the second plate 12 and the mixture 17 in these plates is, therefore, separated from one another. The tubular bipolar magnets 18 are magnetized under a conventional magnetization condition, for example, at approximately 6000 Oe of the magnetic field. This magnetization can be carried out at any time after the injection molding and before using the injection molded mixture as a tubular bipolar magnet.

Figure 9:
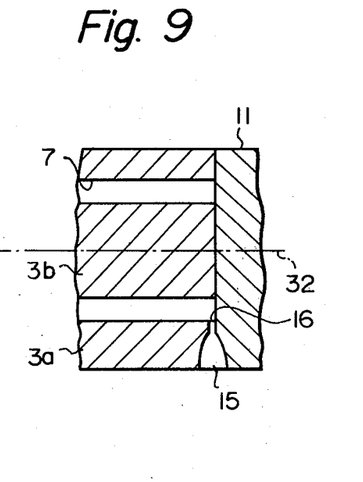
Figure 10:
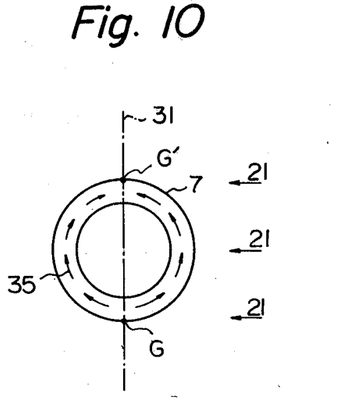

According to the one gate process explained hereinabove, the molten mixture of ferromagnetic material and polymeric material advances in the tubular mold cavity, and the magnetization orientation occurs during the advance of the mixture due to the line of magnetic force which is applied to the mixture in the direction perpendicular to the tubular mold cavity. The magnetic poles of the tubular bipolar magnets are formed in portions of the tubular injection molded mixture after magnetization. These portions are diametrically opposite to one another and the axial line of the tubular bipolar magnets is positioned between these portions. These portions are positioned on the line of magnetic force, which is perpendicular to the axial line mentioned above. The magnetization orientation at these portions occurs while these portions are completely molten. The molten state of the mixture mentioned above is identical at both of these portions, because the distance of one of these portions from the pin gate is the same as the distance of the other portion from the pin gate. Accordingly, the tubular bipolar magnets produced by the one gate process exhibit a good magnetization orientation, excellent symmetry of angular distribution of magnetism and high magnetic flux density. The nozzle aperture 15 may be perpendicular to the end of the tubular mold cavity 7, as illustrated in FIG. 6, but also, may be slanted with respect to the end of the tubular mold cavity 7. Referring to FIG. 9, the gate 16 has a structure of a so-called side gate and terminates in close proximity to the end of the tubular mold cavity 7. It will be apparent from FIG. 10 that the one gate process of the present invention can be carried out in an injection machine using the side gate.

Figure 11:
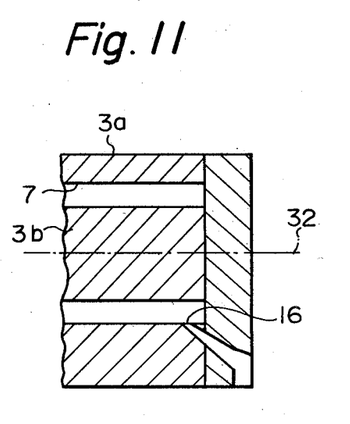
Figure 12:
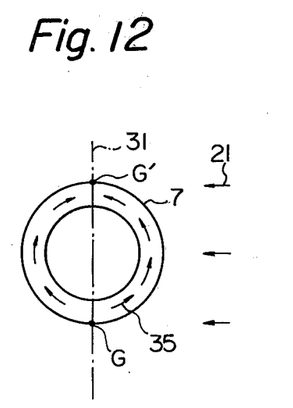

Referring to FIG. 11, the gate 16 has a structure of a so-called submarine gate and terminates at a portion of the outer surface of the tubular mold cavity 7 close to the end of the cavity 7. Referring to FIG. 12, in which the position of the gate 16 is indicated by reference G, it will be apparent that the one gate process of the present invention can be carried out in an injection machine using the submarine gate.

Figure 13:
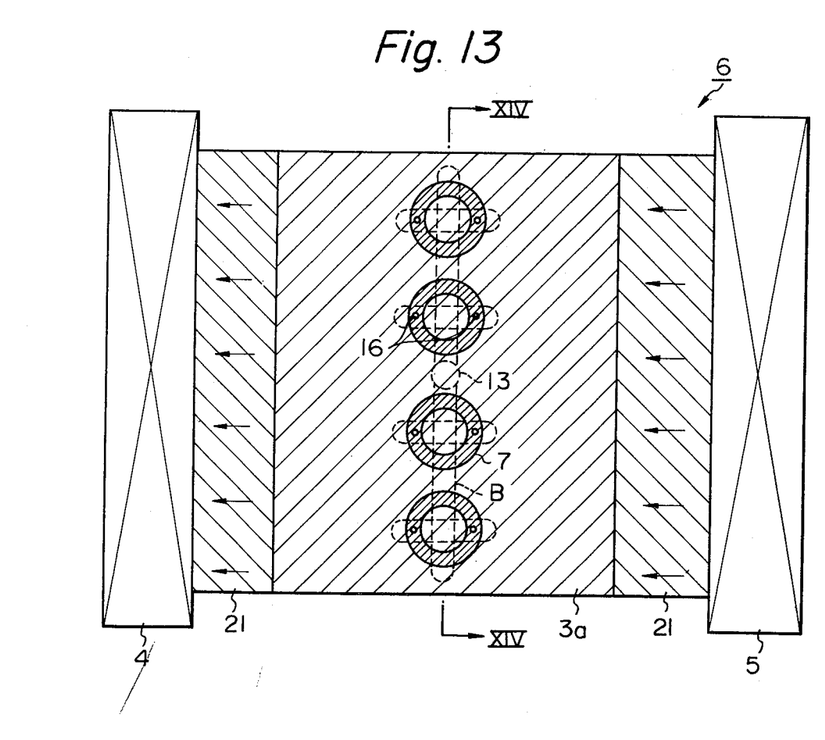
FIGS. 13 and 14 are similar drawings to FIGS. 5 and 6, respectively.
Figure 14:
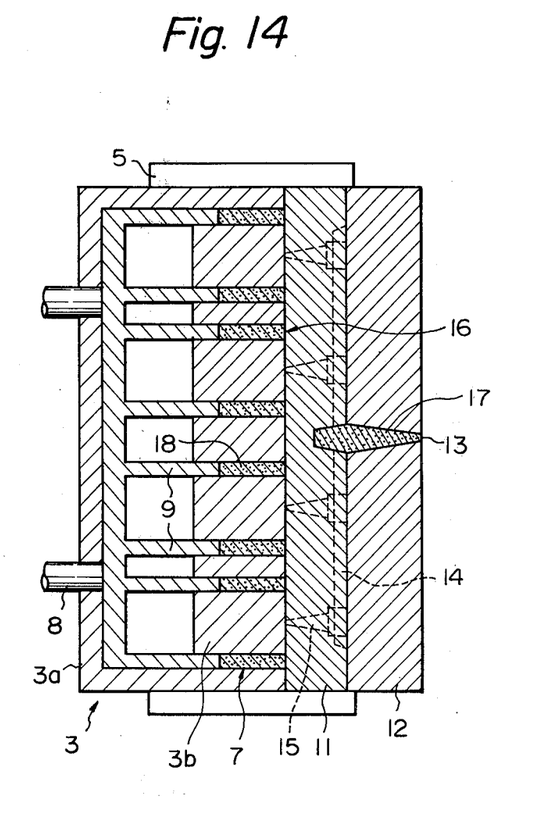

FIGS. 13 and 14 illustrate an injection machine 6 for carrying out the two gate process according to the present invention. The same parts of the injection machine as illustrated in FIGS. 5 and 6 are denoted by the same reference numeral. The number and position of the gates of the injection machine illustrated in FIGS. 13 and 14 are different from those illustrated in FIGS. 5 and 6. Each tubular mold cavity 7 is provided with two pin gates 16. The two pin gates 16 are positioned so that the axial line of the tubular mold cavity 7 is between them. In addition, the two pin gates 16 are arranged in the direction 21 of the magnetic field, which is perpendicular to the axial line of the tubular mold cavity. The end portions of the tubular mold cavity 7 at which the pin gates 16 are positioned are axially symmetrical with each other. The flowability of and, hence, the characteristic of magnetization orientation in the mixture during the injection molding is best in the tubular mold cavity close to these end portions. The two portions of the injection molded mixture where the characteristic of magnetization orientation is best constitute the magnetic poles after magnetization of the mixture. Accordingly, the tubular bipolar magnets produced by the two gate process exhibit a good magnetization orientation, excellent symmetry of angular distribution of magnetism and high magnetic flux density.

Instead of the pin gates, side gates and submarine gates can be used in the two gate process.

The present invention will now be explained by way of Examples.

EXAMPLE 1

Figure 15:
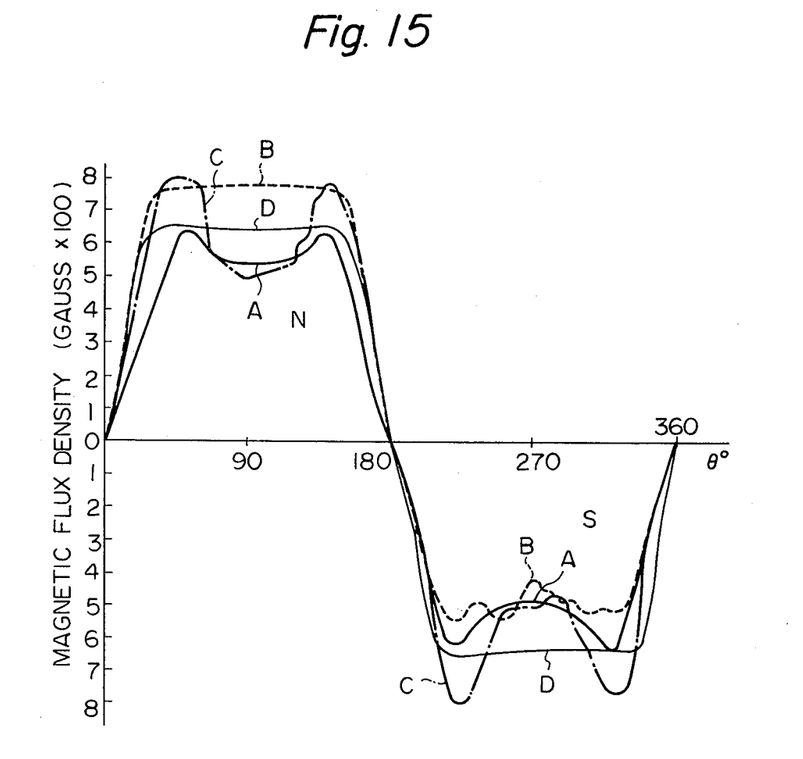
FIGS. 15 and 16 are graphs illustrating an angular distribution of magnetic flux density of flow bipolar anisotropic magnets.

90 parts by weight of barium ferrite powder and 10 parts by weight of nylon 6 were blended in a kneading machine at temperature from 240° to 280° C., and then, extrusion-shaped into pellets. The pellets were injection-molded by an injection machine 6 similar to that illustrated in FIGS. 5 and 6. The injection machine used was provided with five mold cavities. The magnetic field applied by the electromagnets 4 and 5 to the injection molded pellets was 8000 Oe and the temperature of the pellets at the nozzle apertures was 280° C. The molten pellets or mixture of the barium ferrite powder and the nylon 6 was injection-molded through one pin gate 16 into each tubular mold cavity. After demagnetization of the first plate 11 and the second plate 12, these plates were separated from the shaping metallic mold 3 and the insert 9 was pushed forward so as to separate the tubular bipolar magnets from the tubular mold cavity. The tubular bipolar magnets exhibited anisotropy and had an outer diameter of 20 mm, an inner diameter of 14 mm and a length of 15 mm. The tubular bipolar magnets were magnetized at 6000 Oe, with the result that the magnetic poles were formed on two symmetrical portions of the magnets with respect to the axial line thereof. The angular distribution of the magnetic flux density around the so magnetized tubular bipolar magnets was symmetrical, as illustrated by line D in FIG. 15. In FIG. 15, the angles of 90° and 270° indicate the central position of the N and S pole portions of the tubular bipolar magnets, respectively. The total magnetic flux of the tubular bipolar magnets was as seen in the following table.

TABLE 1

| Sample No. | Total Magnetic Flux (Maxwell) |
|---|---|
| 1 | 6650 |
| 2 | 6600 |
| 3 | 6650 |
| 4 | 6650 |
| 5 | 6600 |

EXAMPLE 2

(Control Example)

Five tubular isotropic magnets of barium ferrite were formed by a sintering process and finished by grinding them to the same dimension as that of the magnets of Example 1. These tubular magnets were magnetized to form the magnetic poles on the two symmetrical portions of the magnets with respect to the axial line thereof. The angular distribution of the magnetic flux density was as shown by line A in FIG. 15. The magnetic flux density was disadvantageously low at a range of from 45° to 135° and a range of from 225° to 315° of angular position of the tubular isotropic magnets.

The total magnetic flux of the magnets was as seen in the following table.

TABLE 2

| Sample No. | Total Magnetic Flux (Maxwell) |
| --- | --- |
| 6 | 6000 |
| 7 | 6050 |
| 8 | 6050 |
| 9 | 6000 |
| 10 | 6050 |

It will be seen from Table 2 that the total magnetic flux of the tubular isotropic magnets is lower than that of the tubular bipolar magnets (anisotropic magnets) in Table 1.

EXAMPLE 3

(Control Example)

The process of Example 1 was repeated. However, the position and direction of the pin gates were changed from those shown in FIGS. 5 and 6, so that the direction of the pin gates was parallel to the direction of the magnetic field. The obtained tubular bipolar magnets exhibited anisotropy and the angular distribution of the magnetic flux density was as shown by the curve B in FIG. 15. The angular distribution of magnetic flux density at the N pole portion (90°) was good but irregular at the S pole portion (270°).

The total magnetic flux of the magnets was as shown in the following Table.

TABLE 3

| Sample No. | Total Magnetic Flux (Maxwell) |
| --- | --- |
| 11 | 6500 |
| 12 | 6450 |
| 13 | 6500 |
| 14 | 6450 |
| 15 | 6500 |

EXAMPLE 4

(Control Example)

The process of Example 1 was repeated. However, an additional pin gate was formed at a position opposite to the pin gate 16. The direction of the magnetic field applied to the mixture was perpendicular to the direction of the pin gates. The angular distribution of the magnetic flux density of the magnets was as shown by curve C in FIG. 15. The magnetic flux density was extremely low at 90° and 270°.

EXAMPLE 5

Figure 16:
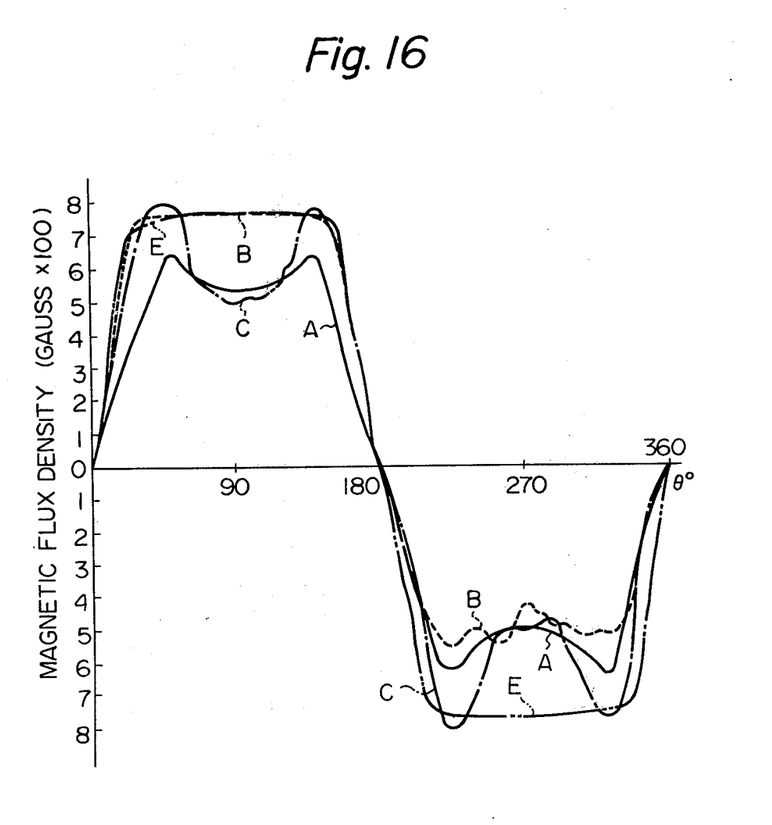

The process of Example 1 was repeated. However, the number and position of the pin gates was changed as illustrated in FIGS. 13 and 14. The angular distribution of the magnetic flux density was as shown by curve E in FIG. 16, in which the same curves A through C as in FIG. 15 are illustrated for comparison with the curve D.

The total magnetic flux of the magnets was as shown in the following Table.

TABLE 4

| Sample No. | Total Magnetic Flux (Maxwell) |
| --- | --- |
| 16 | 7050 |
| 17 | 7100 |
| 18 | 7100 |
| 19 | 7050 |

TABLE 4-continued

| Sample No. | Total Magnetic Flux (Maxwell) |
| --- | --- |
| 20 | 7100 |

What we claim is:

1. An anisotropic polymeric magnet in tubular form, wherein the tubular magnet is formed by injection molding of a mixture of ferromagnetic material and polymeric material, and the magnetization orientation of the magnet is directed in one direction perpendicular to the axial line of the tubular magnet, wherein a weld line or lines are formed at a portion or portions of the tubular magnet such that an imaginary horizontal line connecting said portion or portions with the axis of the tubular magnet is perpendicular to said one direction.

2. An anisotropic polymeric magnet in tubular form according to claim 1, wherein the magnetic poles of said magnet are formed on diametrically opposite portions of said magnet, and the distance of said weld line or lines from one of said magnetic pole is essentially the same as the distance from the other magnetic pole.

3. A process for producing an anisotropic polymeric magnet in tubular form, wherein a mixture of ferromagnetic material powder and polymeric material is injection-molded into the tubular cavity of a mold, while a magnetic field is applied to the injection-molded mixture in a direction perpendicular to the axial line of the tubular mold cavity, and wherein said mixture is injection-molded through one gate formed in the neighborhood of one of the ends of said tubular mold cavity, and the applying direction of said magnetic field is perpendicular to an imaginary line, which connects said gate and an axial symmetrical position of said gate with respect to the axial line of said tubular mold cavity.

4. A process according to claim 3, wherein the weight proportion of ferromagnetic powder to polymeric material is from 97:3 to 83:17.

5. A process according to claim 4, wherein the weight proportion of ferromagnetic powder to polymeric material is from 92:3 to 83:17.

6. A process according to claim 4, wherein the weight proportion of ferromagnetic powder to polymeric material is from 88:12 to 96:4.

7. A process according to claim 6, wherein the weight proportion of ferromagnetic powder to polymeric material is from 88:12 to 90:10.

8. A process according to claim 4 wherein said gate is a pin gate.

9. A process according to claim 4, wherein said gate is a side gate.

10. A process according to claim 4, wherein said gate is a submarine gate.

11. A process for producing an anisotropic polymeric magnet in tubular form, wherein a mixture of ferromagnetic material powder and polymeric material is injection-molded into the tubular cavity of a mold, while a magnetic field is applied to the injection-molded mixture in a direction perpendicular to the axial line of the tubular mold cavity, and wherein said mixture is injection-molded through two gates formed in the neighborhood of one of the ends of said tubular mold cavity, one of said gates is axially symmetrical to the other gate with respect to the axial line of said tubular mold cavity, and the applying direction of said magnetic field is parallel to an imaginary line formed by connecting said two gates with each other.

12. A process according to claim 11, wherein the weight proportion of ferromagnetic powder to polymeric material is from 97:3 to 83:17.

13. A process according to claim 12, wherein the weight proportion of ferromagnetic powder to polymeric material is from 92:3 to 83:17.

14. A process according to claim 12, wherein the weight proportion of ferromagnetic powder to polymeric material is from 88:12 to 96:4.

15. A process according to claim 14, wherein the weight proportion of ferromagnetic powder to polymeric material is from 88:12 to 90:10.

16. A process according to claim 12, wherein said gate is a pin gate.

17. A process according to claim 12, characterized in that said gate is a side gate.

18. A process according to claim 12, wherein said gate is a submarine gate.

* * * * *